United States Patent

Hirata et al.

[11] Patent Number: 5,725,943
[45] Date of Patent: Mar. 10, 1998

[54] MAGNETIC TAPE CARTRIDGE

[75] Inventors: Junichi Hirata, Otokuni-gun; Sadamu Kuse, Minoo; Seigi Kawarai, Ashiya, all of Japan

[73] Assignee: Hitachi Maxell, Ltd., Osaka-fu, Japan

[21] Appl. No.: 222,341

[22] Filed: Apr. 4, 1994

Related U.S. Application Data

[63] Continuation of Ser. No. 925,251, Aug. 6, 1992, abandoned.

[30] Foreign Application Priority Data

Aug. 10, 1991 [JP] Japan ................................ 3-225067

[51] Int. Cl.$^6$ .............................. G11B 5/704; G11B 5/78
[52] U.S. Cl. .................. 428/336; 428/480; 428/694 SL; 428/900; 360/132
[58] Field of Search ........................... 428/694, 900, 428/336, 480, 474.4, 694 SL; 360/132

[56] References Cited

U.S. PATENT DOCUMENTS 5,055,349  10/1991  Yasafuku et al. ..................... 428/323
5,093,064  3/1992  Utsumi et al. ....................... 264/210.7
5,340,636  8/1994  Kamada .............................. 428/141

FOREIGN PATENT DOCUMENTS 59-132421  7/1984  Japan .

OTHER PUBLICATIONS

*Digital Video Recording Technique*, p. 158, Japan, Aug. 1990.

"The Composite Digital Format and Its Applications," Engberg et al., SMPTE Journal, Oct. 1987, pp. 934–942.

*Primary Examiner*—Stevan A. Resan

[57] ABSTRACT

A magnetic tape cartridge comprising a magnetic tape suitable for long time recording which has a coefficient of thermal shrinkage of 0.6% or less the coefficient being measured after the tape is wound around a hub at least 300 turns and kept at 105° C. for 30 minutes.

5 Claims, No Drawings

MAGNETIC TAPE CARTRIDGE

This application is a continuation of application Ser. No. 07/925,251 filed on Aug. 6, 1992, now abandoned.

BACKGROUND OF THE INVENTION

1. Field of the Invention

The present invention relates to a magnetic tape cartridge. More particularly, the present invention relates to a magnetic tape cartridge which has good heat resistance and is suitable for long time recording which cartridge contains a magnetic tape having a small coefficient of thermal shrinkage at high temperatures.

2. Description of the Related Art

Recently, with an increase in quality of image sources, for example, clear visions and satellite broadcasting, digitalization of audio programs by compact discs and satellite broadcasting and generalization of high capacity streamer tapes in the computer field, magnetic tapes for recording these information sources have been required to have an increased recording density and a thin thickness. For example, a DAT cassette tape is required to record a recording wavelength as short as 0.7 μm and have a tape thickness of about 13.5 μm.

To this end, it has been attempted to make a thickness of a magnetic tape to be installed in a cartridge case as thin as possible. However, when the thickness of the magnetic tape is made thin, the mechanical strength of the magnetic tape decreases, electromagnetic conversion characteristics may deteriorate due to a worsening of the contacting condition with a magnetic head, or the magnetic tape may be buckle or broken when it contacts with an edge of a flange for controlling the magnetic tape.

To solve such problems, the mechanical strength of a thin magnetic tape is increased by using, as a base film, a strengthened plastic film such as a polyethylene terephthalate film, which is stretched in a longitudinal or width direction of the film.

While the strengthened plastic film such as the highly stretched polyethylene terephthalate film is excellent in strength, it will shrink at a temperature higher than 60° C. because of stretching and to degree of shrinkage is very high at a temperature higher than 80° C.

Since such shrinkage is hardly found under normal conditions for using the conventional magnetic tapes and there are no defects in the analog recording and reproducing in a long wavelength range, attention has been given as to the increase in the strength of the base film and the shrinkage of the base film has not been considered.

However, when problems caused by the shrinkage of the base film were studied with the assumption that the shrinkage of the base film would cause some problems in the recording and reproducing of the DAT cassette tape, it was found that, due to the shrinkage of the base film, winding pressure on the tape is increased near a center of the tape wound around a hub by wind fastening so that steps made by splicing the tape or clamping is transferred to the tape and dusts is trapped, whereby the tape is partly deformed. When the tape is partly deformed, a gap between the magnetic tape and the magnetic head increases during reproduction and the recorded signals are not read at a sufficient level so that errors are generated. When a proportion of the errors exceeds 10%, correction of the errors is impossible so that sound skipping happens and then a quality of sound is greatly decreased in the DAT cassette tape.

The strength of wind fastening near the center of the wound magnetic tape is large when the coefficient of thermal shrinkage is large and when the number of winding is large. The deformation of the magnetic tape is significant when the tape is thin and the glass transition temperature of the base film is low. As the recording wavelength decreases, the sound quality greatly decreases since the number of dropped signals increases.

Regardless of whether the tape is for audio, video or computer use, in a circumstance where applications of the magnetic tapes are diversified and conditions under which the magnetic tapes are used are expanded, the magnetic tape is required to have no problems even when used in an automobile which is parked under sunshine for a long time and which temperature may reach around 90° C. But, the conventional stretched strengthened plastic film cannot satisfy such a severe requirement.

SUMMARY OF THE INVENTION

An object of the present invention is to provide a base film of a magnetic tape which can provide a magnetic tape having good performances even under severe conditions such as high temperatures.

Another object of the present invention is to provide a magnetic tape cartridge which has good heat resistance and is suitable for long time recording.

According to the present invention, there is provided a magnetic tape cartridge comprising a magnetic tape which has a coefficient of thermal shrinkage of 0.6% or less after it is wound around a hub at least 300 turns and kept at 105° C. for 30 minutes.

DETAILED DESCRIPTION OF THE INVENTION

In the present invention, the magnetic tape installed in a tape cartridge has a coefficient of thermal shrinkage of 0.6% or less, preferably 0.4% or less after it is wound around a hub at least 300 turns and preferably 350 turns and kept at 105° C. for 30 minutes. When this coefficient of thermal shrinkage exceeds 0.6%, the magnetic tape deforms at high temperatures so that the sound is dropped and sound quality is severely deteriorated. For a long time recording, the magnetic tape should be wound at least 300 turns around the hub.

The magnetic tape having the above defined coefficient of thermal shrinkage can be produced by optionally heat treating a plastic base film at a temperature of 80° to 100° C. for at least one hour to make the coefficient of thermal shrinkage in a longitudinal direction of the base film 0.6% or less after being kept at 105° C. for 30 minutes, and forming a magnetic layer on the so-treated base film, or by forming a magnetic layer on a base film and heat treating the base film having the magnetic layer at a temperature of 80° to 100° C. for at least one hour. Thereafter, the base film having the magnetic layer is cut to a suitable width to produce a magnetic tape.

Then, the magnetic tape is wound around a hub in a cartridge case at least 300 turns to obtain a magnetic tape cartridge which suffers from no deformation of the magnetic tape, no sound dropping or sound deterioration or no signal skipping even after being kept at 90° C.

When the magnetic tape is produced in the manner as described above, the fastening force near the center of the wound tape is not so large. Therefore, when the tape is wound around the hub for at least 300 turns or more and used for an extended recording time, no tape deformation is experienced even if a tape thickness is 14 µm or less. In addition, when digital signals having a short recording wavelength of 1 µm or less are recorded, the signal drops hardly occur.

In the heat treatment of the plastic base film which is necessary for the plastic base film having a large coefficient of thermal shrinkage before or after the formation of the magnetic layer, when the heating temperature is lower than 80° C., the coefficient of thermal shrinkage is not sufficiently decreased. When the heating temperature is higher or The heating time is longer, the coefficient of thermal shrinkage is further decreased. However, when the heating temperature is higher than 100° C., a Young's modulus due so balancing may decrease or the film wrinkles greatly. Therefore, the base film with or without the magnentic layer is preferably heated at a temperature of from 80° to 100° C., more preferably from 85° to 95° C. for at least one hour.

Any of suitable plastic base film may be used in the present invention. Examples of the plastic base film are polyethylene terephthalate film, polyethylene naphalate film, polyaramid film and the like. When the magnetic tape cartridge is used at a high temperature around 90° C., a plastic base film having a glass transition temperature of 100° C. or higher is preferably used to suppress the deformation of the tape near the center of the wound tape caused by the wind fastening.

The magnetic layer can be formed by a conventional method, for example, by mixing a magnetic powder, a binder resin, an organic solvent and other components to prepare a magnetic paint, coating the magnetic paint on the already heat treated base film and drying it, or coating the magnetic paint on the base film which has not been heat treated and drying it. In the latter case, the coated film is then heat treated. The base film having the coated magnetic layer is cut so a suitable width to produce a magnetic tape.

As the magnetic powder, any of the conventionally used powders may be used. Examples of the magnetic powder are γ—$Fe_2O_3$ powder, $Fe_3O_4$ powder, Co-containing γ-$Fe_2O_3$, Co-containing $Fe_3O_4$ powder, $CrO_2$ powder and magnetic metal powders such as Fe powder.

As the binder resin, any of the conventionally used binders such as vinyl chloride-vinyl acetate copolymer, cellulose resin, polyurethane resin, polyester resin, polyvinyl butyral resin, isocyanate compounds and the like may be used.

Examples of the organic solvent are methyl isobutyl ketone, methyl ethyl ketone, cyclohexanone, ethyl acetate, tetrahydrofuran, dioxane, toluene, xylene and the like. They may be used independently or as a mixture thereof.

On an opposite surface of the plastic base film having the magnetic layer on one surface, a back coating layer may be formed. The back coating layer can be formed by mixing a non-magnetic powder, a binder resin, an organic solvent and necessary components to prepare a backcoating paint, coating the backcoating paint on the opposite surface of the plastic base film and drying it.

As the non-magnetic powder in the back coating, any of the conventionally used powder may be used. Examples of the non-magnetic powder are α-$Fe_2O_3$, $Al_2O_3$, $Cr_2O_3$, $TiO_2$, $CaCO_3$, carbon black and the like. As the binder resin and the organic solvent, those exemplified in connection with the magnetic layer can be used.

PREFERRED EMBODIMENTS OF THE INVENTION

The present invention will be illustrated by following Examples, in which "parts" are by weight unless otherwise indicated.

EXAMPLE 1

The following components were mixed in a ball mill for 96 hours to obtain a magnetic paint:

| Component | Parts |
| --- | --- |
| Acicular Fe powder | 100 |
| (BET specific surface area: 50 $m^2/g$) | |
| Vinyl chloride base resin | 12 |
| (VAGH manufactured by U.C.C., USA) | |
| Urethane resin | 8 |
| (T-5205 manufactured by Dainippon Ink Chemical Industries, Ltd.) | |
| Polyisocyanate | 2 |
| (Colonate L manufactured by Nippon polyurethane Industries, Ltd.) | |
| Stearic acid | 4 |
| n-Butyl stearate | 2 |
| Cyclohexanone | 53 |
| Methyl ethyl ketone | 53 |
| Toluene | 53 |

A polyethylene terephthalate film having a glass transition temperature of 70° C. was heated at 90° C. for 8 hours so that it had a coefficient of thermal shrinkage of 0.5% after being kept at 105° C. for 30 minutes and a thickness of 10 µm.

Then, on one surface of the polyethylene terephthalate film, the above prepared magnetic paint was coated to a dry thickness of 3.0 µm and dried to form a magnetic layer, which was then calendered.

Separately, the following components were mixed in a ball mill for 96 hours to obtain a backcoating paint:

| Component | Parts |
| --- | --- |
| Carbon black | 100 |
| α-$Fe_2O_3$ | 5 |
| Nitrocellulose | 50 |
| Urethane resin | 30 |
| (HI 12000 manufactured by Dainippon Ink Chemical Industries, Ltd.) | |
| Polyisocyanate | 20 |
| (Colonate L manufactured by Nippon polyurethane Industries, Ltd.) | |
| Methyl ethyl ketone | 266 |
| Toluene | 266 |
| Cyclohexanone | 266 |

The resulting backcoating paint was coated on the other surface of the polyethylene terephthalate film having the magnetic layer on one surface to a dry thickness of 0.5 µm and dried to form a backcoating layer Then, the polyethylene terephthalate film having the magnetic layer and the backcoating layer was cut to a width of ½ inch to obtain a magnetic tape. A total thickness of the magnetic tape was 13.5 µm.

The obtained tape was wound around a hub for 350 turns with the backcoating layer facing inside and then installed in a DAT cartridge case to produce a magnetic tape cartridge.

EXAMPLE 2

In the same manner as in Example 1 except that a polyethylene naphthalate film with a glass transition temperature of 105° C. which had been heat treated at 90° C. for one hour and had a coefficient of thermal shrinkage of 0.4% after being kept at 105° C. for 30 minutes and a thickness of 10 µm was used in place of the polyethylene terephthalate film having the coefficient of thermal shrinkage of 0.5% after being kept at 105° C. for 30 minutes, a magnetic tape having a total thickness of 13.5 µm was produced, and a magnetic tape cartridge was produced.

EXAMPLE 3

In the same manner as in Example 1 but using a polyethylene terephthalate film with a glass transition temperature of 70° C. which had not been heat treated and had a coefficient of thermal shrinkage of 1.3% after being kept at 105° C. for 30 minutes and a thickness of 10 µm was used in place of the polyethylene terephthalate film having the coefficient of thermal shrinkage of 0.5% after being kept at 105° C. for 30 minutes, a magnetic layer and a coating layer were formed on respective surfaces of the polyethylene terephthalate film.

Then, the polyethylene terephthalate film having the magnetic layer and the backcoating layer was heat treated at 90° C. for 8 hours and cut to a width of ½ inch to obtain a magnetic tape having a total thickness of 13.5 µm.

The magnetic tape was wound around a hub and installed in a cartridge case to obtain a magnetic tape cartridge.

EXAMPLE 4

In the same manner as in Example 1 except that a polyethylene terephthalate film with a glass transition temperature of 70° C. which had been heat treated at 90° C. for 8 hours and had a coefficient of thermal shrinkage of 0.5% after being kept at 105° C. for 30 minutes and a thickness of 11.5 µm was used in place of the polyethylene terephthalate film having the coefficient of thermal shrinkage of 0.5% after being kept at 105° C. for 30 minutes and the thickness of 10 µm, a magnetic tape having a total thickness of 15 µm was produced, and a magnetic tape cartridge was produced.

Comparative Example 1

In the same manner as in Example 1 except that a polyethylene terephthalate film with a glass transition temperature of 70° C. which had not been heat treated and had a coefficient of thermal shrinkage of 1.3% after being kept at 105° C. for 30 minutes and a thickness of 10 µm was used in place of the polyethylene terephthalate film having the coefficient of thermal shrinkage of 0.5% after being kept at 105° C. for 30 minutes, a magnetic tape having a total thickness of 13.5 µm was produced, and a magnetic tape cartridge was produced.

Comparative Example 2

In the same manner as in Example 1 except that a polyethylene terephthalate film with a glass transition temperature of 70° C. which had been heat treated at 90° C. for 30 minutes and had a coefficient of thermal shrinkage of 0.7 after being kept at 105° C. for 30 minutes and a thickness of 10 µm was used in place of the polyethylene terephthalate film having the coefficient of thermal shrinkage of 0.5% after being kept at 105° C. for 30 minutes, a magnetic tape having a total thickness of 13.5 µm was produced, and a magnetic tape cartridge was produced.

Comparative Example 3

In the same manner as in Comparative Example 1 except that the number of tape windings around the hub was changed from 350 turns to 200 turns, a magnetic tape cartridge was produced.

Comparative Example 4

In the same manner as in Example 4 except that a polyethylene terephthalate film with a glass transition temperature of 70° C. which had been heat treated at 90° C. for 30 minutes and had a coefficient of thermal shrinkage of 0.7% after being kept at 105° C. for 30 minutes and a thickness of 11.5 µm was used in place of the polyethylene terephthalate film having the coefficient of thermal shrinkage of 0.5 after being kept at 105° C. for 30 minutes, a magnetic tape having a total thickness of 15 µm was produced, and a magnetic tape cartridge was produced.

A coefficient of thermal shrinkage was measured in a longitudinal direction of each base film and each magnetic tape after being kept at 105° C. for 30 minutes. That is, each base film or each magnetic tape was cut to a length of 20 cm. After heating each test piece of the magnetic tape or the magnetic tape in an oven at 105° C. for 30 minutes, a length of the test piece was measured. A percentage of a difference of the length of the test piece before and after heating per the original length (20 cm) of the test piece was calculated.

On the magnetic tape cartridge produced in Examples and Comparative Examples, 1000 Hz signals with the shortest recording wavelength of 0.7 µm were recorded using a commercially sold DAT deck and the cartridge was kept at 90° C. for 12 hours. Then, the recorded signals were reproduced. A degree of deformation of the tape near the center of the wound tape was observed with naked eyes. Also, a percentage of error generation and presence of sound skipping were evaluated.

The results are shown in Tables 1 and 2.

TABLE 1

| Example No. | Total thickness of magnetic tape (µm) | Coefficient of thermal shrinkage of base film (%) | Coefficient of thermal shrinkage of magnetic tape (%) | Number of magnetic tape winding (turns) |
| --- | --- | --- | --- | --- |
| 1 | 13.5 | 0.5 | 0.5 | 350 |
| 2 | 13.5 | 0.4 | 0.4 | 350 |
| 3 | 13.5 | 1.3 | 0.5 | 250 |
| 4 | 15 | 0.5 | 0.5 | 350 |
| C. 1 | 13.5 | 1.3 | 1.1 | 350 |
| C. 2 | 13.5 | 0.7 | 0.7 | 350 |
| C. 3 | 13.5 | 1.3 | 1.1 | 200 |
| C. 4 | 15 | 0.7 | 0.7 | 350 |

TABLE 2

| Example No. | Deformation of magnetic tape | Error generation (%) | Sound skipping |
| --- | --- | --- | --- |
| 1 | No | 1.5 | No |
| 2 | No | 0.25 | No |
| 3 | No | 2 | No |
| 4 | No | 1 | No |
| C. 1 | Much | 15 | Many |
| C. 2 | Yes | 12 | Many |
| C. 3 | No | 3 | No |
| C. 4 | Slight | 10.5 | Yes |

As seen from the results of Tables 1 and 2, the conventional magnetic tape cartridge in which the number of magnetic tape winding was 200 turns (Comparative Example 3) had neither deformation of magnetic tape nor sound skipping and low error generation, but the conventional magnetic tape cartridges in which the number of magnetic tape winding was increased to 350 turns (Comparative Examples 1, 2 and 4) had deformation of magnetic tape and sound skipping and large error generation. On the contrary, according to the present invention, when the number of magnetic tape winding was 350 turns, neither deformation of magnetic tape nor sound skipping was observed and the error generation was low.

What is claimed is:

1. A magnetic tape cartridge for recording and reproducing digital signals having a wavelength of 1 μm or less, comprising:

a magnetic tape including:

a base film which has a glass transition temperature Tg of 70° C., which has a pre-heat-treatment coefficient of thermal shrinkage exceeding 0.6% in its longitudinal direction as measured in an unloaded state after being kept at 105° C. for 30 minutes in a pre-heat-treated and unloaded state, and which subsequently is heat treated at a temperature of 80° to 100° C. for at least one hour to produce a coefficient of thermal shrinkage of 0.6% or less in a longitudinal direction of the tape as measured in an unloaded state after being kept at 105° C. for 30 minutes in an unloaded state; and a magnetic layer formed on said base film;

wherein said magnetic tape has a total thickness of 14 μm or less; and wherein said magnetic tape has a coefficient of thermal shrinkage of 0.6% or less in a longitudinal direction of the tape as measured in an unloaded state after being kept at 105° C. for 30 minutes in an unloaded state, said magnetic tape being wound around a hub at least 300 turns.

2. The magnetic tape cartridge as in claim 1, wherein said base film is polyethylene terephthalate film.

3. A magnetic tape cartridge for recording and reproducing digital signals having a wavelength of 1 μm or less, comprising:

a magnetic tape including:

a base film of polyethylene terephthalate film, which has a pre-heat-treatment coefficient of thermal shrinkage exceeding 0.6% in its longitudinal direction as measured in an unloaded state after being kept at 105° C. for 30 minutes in a pre-heat-treated and unloaded state, and which subsequently is heat treated at a temperature of 80° to 100° C. for at least one hour to produce a coefficient of thermal shrinkage of 0.6% or less in a longitudinal direction of the tape as measured in an unloaded state after being kept at 105° C. for 30 minutes in an unloaded state; and a magnetic layer formed on said base film;

wherein said magnetic tape has a total thickness of 14 μm or less; and wherein said magnetic tape has a coefficient of thermal shrinkage of 0.6% or less in a longitudinal direction of the tape as measured in an unloaded state after being kept an 105° C. for 30 minutes in an unloaded state, said magnetic tape being wound around a hub at least 300 turns.

4. A method for producing a magnetic tape cartridge for recording and reproducing digital signals having a wavelength of 1 μm or less, comprising the steps of:

heat treating a base film, which has a glass transition temperature Tg of 70° C., which has a pre-heat-treating coefficient of thermal shrinkage exceeding 0.6% in its longitudinal direction as measured in an unloaded state after being kept at 105° C. for 30 minutes in an unloaded state, at a temperature of 80° to 100° C. for at least one hour to produce a coefficient of thermal shrinkage of 0.6% or less in a longitudinal direction of the tape as measured in an unloaded state after being kept at 105° C. for 30 minutes in an unloaded state;

forming a magnetic layer on said base film to form a magnetic tape which has a total thickness of 14 μm or less and which has a coefficient of thermal shrinkage of 0.6% or less in a longitudinal direction of the tape as measured in an unloaded state after being kept at 105° C. for 30 minutes in an unloaded state; and winding said magnetic tape at least 300 turns around a hub.

5. The magnetic tape cartridge as in claim 4, wherein said base film is polyethylene terephthalate film.

* * * * *